United States Patent
Malhotra et al.

(10) Patent No.: US 10,084,700 B1
(45) Date of Patent: Sep. 25, 2018

(54) METHOD AND SYSTEM FOR CONTROLLING MESSAGE ROUTING

(71) Applicant: Sprint Spectrum L.P., Overland Park, KS (US)

(72) Inventors: Rajil Malhotra, Olathe, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 127 days.

(21) Appl. No.: 15/277,697

(22) Filed: Sep. 27, 2016

(51) Int. Cl.
*H04W 4/00* (2018.01)
*H04L 29/06* (2006.01)
*H04L 12/721* (2013.01)
*H04W 4/14* (2009.01)
*H04L 12/707* (2013.01)
*H04W 24/02* (2009.01)
*H04L 29/08* (2006.01)
*H04W 88/16* (2009.01)

(52) U.S. Cl.
CPC .............. *H04L 45/70* (2013.01); *H04L 45/22* (2013.01); *H04L 65/1006* (2013.01); *H04L 65/1016* (2013.01); *H04L 65/1069* (2013.01); *H04L 67/303* (2013.01); *H04W 4/14* (2013.01); *H04W 24/02* (2013.01); *H04W 88/16* (2013.01)

(58) Field of Classification Search
None
See application file for complete search history.

(56) References Cited

U.S. PATENT DOCUMENTS

| | | | | |
|---|---|---|---|---|
| 7,702,342 | B2* | 4/2010 | Duan | H04W 4/14 370/338 |
| 9,973,907 | B1* | 5/2018 | Cham | H04W 4/14 |
| 2008/0039104 | A1* | 2/2008 | Gu | H04W 8/04 455/445 |
| 2009/0129372 | A1* | 5/2009 | Pandey | G06Q 30/0267 370/352 |
| 2009/0323636 | A1* | 12/2009 | Dillon | H04L 29/12188 370/331 |
| 2011/0249624 | A1* | 10/2011 | Ramachandran | H04W 48/18 370/328 |
| 2013/0005371 | A1* | 1/2013 | Cai | H04W 4/18 455/466 |
| 2014/0376511 | A1* | 12/2014 | Kalapatapu | H04L 65/1016 370/331 |
| 2015/0350983 | A1* | 12/2015 | Kwok | H04L 65/1069 370/331 |
| 2016/0150497 | A1* | 5/2016 | Janosi | H04L 65/1016 455/435.1 |
| 2018/0041548 | A1* | 2/2018 | Kalapatapu | H04L 65/1083 |

* cited by examiner

Primary Examiner — Eunsook Choi

(57) ABSTRACT

A method and system to help control message routing in a scenario where a client device is registered with a media system via a first network and the media system is configured by default use the first network as a primary route for routing messages to the WCD. Per the disclosure, the media system will detect, while the client device is so registered via the first network, that a second network is serving the client device with a voice call, and the media system will responsively be reconfigured to use the second network as a primary route for routing of messages destined to the client device. Further, the media system may then subsequently detect that the voice call has ended, and the media system may responsively revert to being configured to use the first network as the primary route for routing of messages destined to the client device.

20 Claims, 4 Drawing Sheets

METHOD AND SYSTEM FOR CONTROLLING MESSAGE ROUTING

BACKGROUND

A typical communication system includes a plurality of access networks each configured to provide client devices with connectivity to various transport networks and service platforms. These access networks may serve client devices over wired and/or wireless channels, to facilitate circuit-switched and/or packet-switched communication of various forms. By way of example, a communication system may include multiple radio access networks (RANs) each configured to provide wireless communication devices (WCDs), such as cell phones or other wirelessly-equipped devices, with connectivity to one or more transport networks such as the public switched telephone network (PSTN) and/or the Internet for instance, and to provide WCDs with connectivity to one or more telephony and messaging service platforms.

A representative communication system, for instance, may include two access networks, one that functions primarily to provide client devices with access to engage in packet-switched communications such as Internet Protocol (IP) based communications, and another that functions primarily to provide client devices with access to engage in circuit-switched communications such as legacy voice calling services. For example, the first access network may be a Long Term Evolution (LTE) network, which functions primarily to provide WCDs with access to engage in high speed packet-data communications, and the second access network may be a legacy Code Division Multiple Access (CDMA) or Global System for Mobile Communications (GSM) network, which functions primarily to provide WCDs with access to engage in voice calls. Other examples are possible as well.

In such an arrangement, both access networks may connect with a common media system that is configured to handle message communication, such as Short Message Service (SMS) communication, to and from served devices. For instance, both access networks may connect with an IP multimedia subsystem (IMS), and the IMS may include an SMS gateway that is configured to receive, store, and forward SMS messages to WCDs served by either access network. In practice, the SMS gateway could be configured to use different types of routing mechanisms for transmitting SMS messages to WCDs via the different access networks. For example, the SMS gateway could be configured to use the well-known Session Initiation Protocol (SIP) for routing SMS messages to WCDs via access networks that provide WCDs with packet-switched communication service, and the SMS gateway could be configured to use the well-known IS-41 signaling protocol for routing SMS messages to WCDs via other, legacy access networks.

OVERVIEW

In a representative arrangement as described above, the IMS could be configured such that its SMS gateway uses one access network by default as a primary route for routing SMS messages to WCDs when the WCDs are registered with the IMS via that particular access network. For instance, if a WCD is registered with the IMS via an LTE access network, the IMS may be configured by default to use the LTE access network as a primary route for routing SMS messages destined to the WCD, and to then use a legacy access network, such as a CDMA network, as a secondary route for routing to the WCD if and when routing to the WCD via the LTE network fails.

A problem with this arrangement can arise, however, if a WCD that is registered with the IMS via the LTE network leaves service of the LTE network temporarily to engage in a voice call served by the legacy network. This may happen with certain WCDs that are configured to operate with LTE service by default for data service but to switch over to a legacy network, such as a CDMA network, to place or receive a voice call served by the legacy network. When that happens, the WCD may remain registered with the IMS via the LTE network while the legacy network is serving the WCD with the voice call, and so the SMS gateway may use the LTE network as the primary route for routing SMS messages destined to the WCD. But this can result in significant delay in SMS message transmission to the WCD.

In particular, when the SMS gateway receives an SMS message destined to the WCD while the WCD is being served with the voice call by the legacy network, the SMS gateway would attempt routing of the SMS message to the WCD via the LTE network. Yet because the WCD has left service of the LTE network to engage in the voice call served by the legacy network, this routing of the SMS message to the WCD via the LTE network may fail, and this failure may cause the SMS gateway to then attempt routing of the SMS message to the WCD via the legacy network as a secondary route. As a result, SMS message delivery to the WCD may be substantially delayed, leading to user-experience issues.

Disclosed herein is a method and system to help address this problem. The disclosure addresses a scenario where a client device is registered with a media system via a first access network and the media system is configured by default use the first access network as a primary route for routing messages to the WCD. In accordance with the disclosure, the media system will detect, while the client device is so registered via the first access network, that a second access network is serving the client device with a voice call, and the media system will then responsively be reconfigured to use the second access network as a primary route for routing of messages destined to the client device. Further, the media system may then subsequently detect that the voice call has ended, and the media system may responsively revert to being configured to use the first access network as the primary route for routing of messages destined to the client device.

Accordingly, in one respect, disclosed is a method for controlling routing of SMS messages in an arrangement comprising a first access network, a second access network, and a media system, in a scenario where, when a WCD is registered with the media system via the first access network, the media system is configured to use the first access network as a primary route for routing SMS messages destined to the WCD. As disclosed, the method includes, while the WCD is registered with the media system via the first access network, the media system detecting that the second access network is serving the WCD with a voice call. And the method then includes, responsive to that detecting, reconfiguring the media system to use the second access network, rather than the first access network, as the primary route for routing SMS messages destined to the WCD, notwithstanding the fact that the WCD is registered with the media system via the first access network.

In another respect, disclosed is an IMS that is configured to control routing of SMS messages. The IMS includes an SMS gateway that is operable to route SMS messages via a first access network and is operable to route SMS messages via a second access network, and when a WCD is registered with the IMS via the first access network, the SMS gateway defaults to using the first access network as a primary route for routing SMS messages destined to the WCD. Further, the IMS includes a telephony application server (TAS) operable to engage in voice call setup signaling with the second access network, and a call session control function (CSCF) through which the voice call setup signaling passes. In this arrangement, the TAS or CSCF (i) detects, based on the voice call setup signaling, that the second access network is serving the WCD with a voice call and (ii) responds to the detecting by causing the SMS gateway to use the second access network, rather than the first access network, as the primary route for routing SMS messages destined to the WCD, notwithstanding the fact that the WCD is registered with the IMS via the first access network.

Still further, in another respect, disclosed is a method for controlling routing of messages, in a scenario where a media system is configured by default to use a first access network as a primary route for routing messages destined to a client device when the client device is registered with the media system via the first access network. As disclosed, the method includes the media system detecting, while the client device is registered with the media system via the first access network, that a second access network is serving the client device with a voice call. And the method includes, responsive to the detecting, reconfiguring the media system to use the second access network, rather than the first access network, as the primary route for routing messages destined to the client device, even though the client device is still registered with the media system via the first access network.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
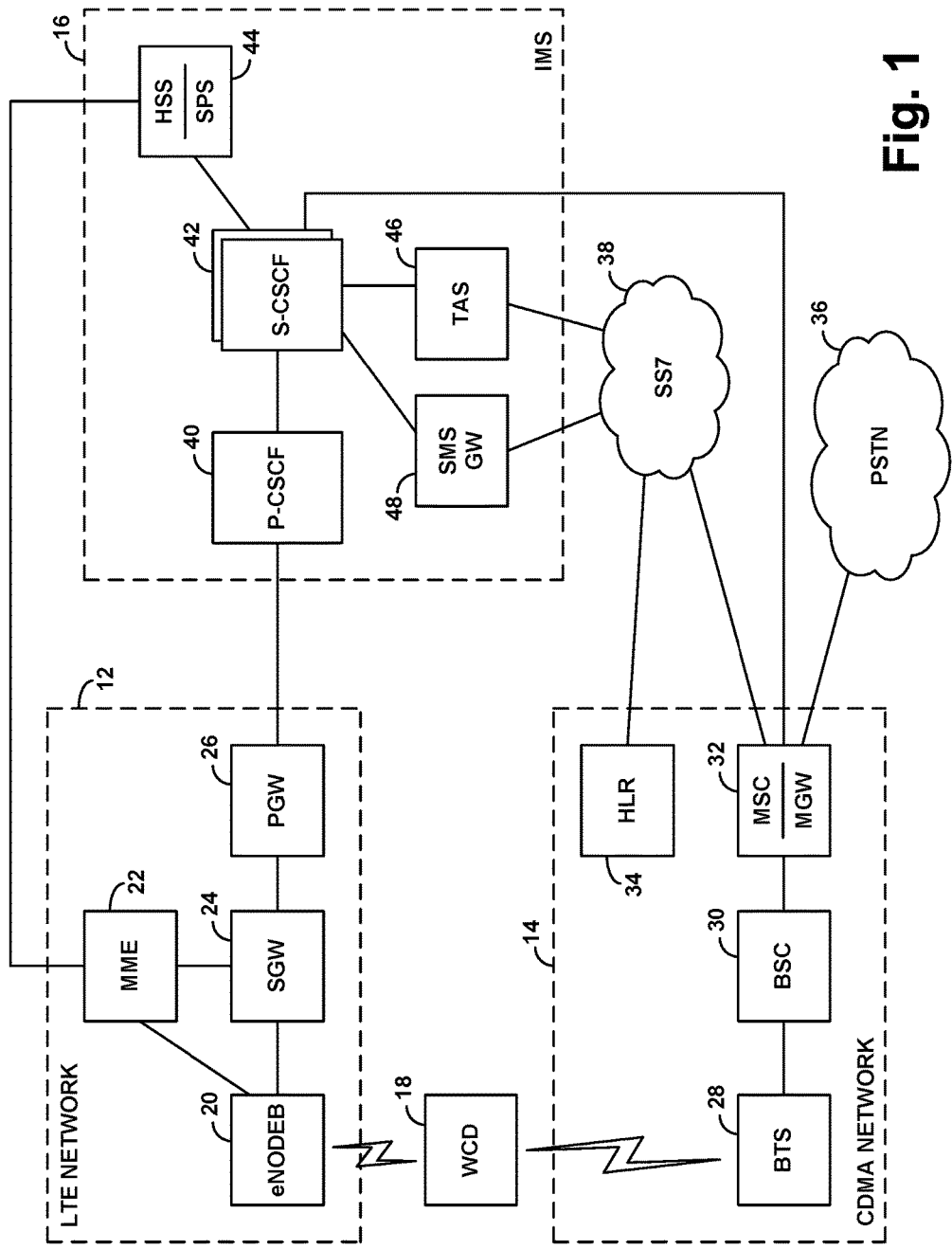
FIG. 1 is a simplified block diagram of an example arrangement in which principles of the present disclosure can be implemented.

The present disclosure will focus by way of example on an arrangement including LTE and CDMA access networks and an IMS having an SMS gateway for routing SMS messages. It will be understood, however, that the specifics shown and described are intended only as examples, and that numerous variations are possible. For instance, the principles discussed can be applied in an arrangement involving other types of access networks, other types of media systems, and/or other types of messaging systems. Further, even within the examples disclosed, various elements (e.g. components and/or operations) can be rearranged, distributed, integrated, reordered, omitted, added, and otherwise modified.

Referring to the drawings, as noted above, FIG. 1 is a simplified block diagram of an example arrangement in which principles of the present disclosure can be implemented. As shown, the example arrangement includes an example LTE access network 12, an example CDMA access network 14, and an example IMS 16, with the LTE and CDMA access networks each connecting with the IMS and each providing respective wireless coverage in which to serve WCDs. Shown within coverage of both access networks is then a representative WCD 18.

The example LTE network 12 includes an LTE evolved-Node-B (eNodeB) 20, a mobility management entity (MME) 22, a serving gateway (SGW) 24, and a packet-data network gateway (PGW) 26. In practice, the eNodeB radiates to provide an LTE coverage area in which to serve WCDs, the MME the serves as a controller for tracking location of WCDs, paging WCDs, and management of bearer connections for WCDs, the SGW and PGW serve as gateways to convey packet-data transmitted to and from the WCD, with the PGW providing connectivity with one or more packet-data networks (not shown) and specifically with the IMS.

With this arrangement, when WCD 18 initially enters into coverage of the LTE network, the WCD may engage in random access and radio-resource-control signaling with the eNodeB to establish a radio-link-layer connection between the WCD and the eNodeB. Further, the WCD may then engage in attach signaling with the MME via that radio-link-layer connection, to register for service with the LTE network. Namely, the WCD may transmit an attach request via the eNodeB to the MME, and the WCD may engage in signaling to facilitate establishment of one or more bearers for the WCD and assignment to the WCD of an IP address for engaging in packet-data communication.

In practice, the MME may engage in signaling with a home subscriber server (HSS) (shown functionally within the IMS in FIG. 1) to determine what bearers to establish for the WCD, based on a service profile record for the WCD. For instance, the MME may thereby determine to establish for the WCD a best-efforts bearer for carrying general packet-data communication to and from the WCD and an IMS signaling bearer for carrying IMS signaling, such as SIP messages between the WCD and the IMS. The MME may then engage in signaling with the SGW and the eNodeB, with the SGW in turn engaging in signaling with the PGW, to establish each of these bearers. Each established bearer would then extend between the WCD and the PGW, with a radio-bearer portion extending between the WCD and the eNodeB, and an access-bearer portion extending between the eNodeB and the PGW, thereby enabling the WCD to engage in packet-data communication accordingly.

The CDMA network 14, on the other hand, includes a CDMA base transceiver station (BTS) 28, a base station controller (BSC) 30, a mobile switching center (MSC) 32, and a home location register (HLR) 34. In practice, the BTS 28 radiates to provide a CDMA coverage area in which to serve WCDs, the BSC controls certain operations of the BTS, and the MSC serves as a controller for paging WCDs and provides connectivity with the PSTN 36 for purposes of connecting incoming and outgoing voice calls. In addition, as shown, the MSC also connects with a Signaling System #7 (SS7) signaling network 38, for carrying signaling messages such as call setup messages and SMS messages, and the HLR is also accessible via the SS7 network.

With this arrangement, when a WCD initially enters into coverage of the CDMA network, the WCD may engage in CDMA registration by transmitting a registration request message on an air interface access channel to the BTS. The registration request message would then pass to the MSC, and the MSC would responsively send a corresponding registration notification to the HLR, to register the fact that the WCD is operating in the MSC's serving area. Further, the HLR may responsively provide the MSC with various advanced-intelligent-network (AIN) triggers to facilitate MSC handling of voice call setup for the WCD and the like.

The IMS 16 is then shown including various nodes (e.g. computer servers or the like) to facilitate various IMS operations. In particular, the IMS includes a proxy CSCF (P-CSCF) 40, which serves to handle and operate on IMS signaling (e.g., SIP signaling) between the IMS and the LTE network, and one or more serving CSCFs (S-CSCFs) 42, which serve to handle and operate on IMS signaling passing between various nodes of the IMS. Further, the IMS includes a subscription profile server (SPS) 44, possibly integrated with the HSS as shown, which is provisioned with a service profile record respectively for each of various served WCDs, indicating service capabilities and other profile attributes per WCD. And the IMS includes a telephony application server (TAS) 46, which serves to control voice call setup for WCDs, and an SMS gateway (SMS GW) 48, which, as noted above, serves to handle SMS message communication to and from WCDs.

As further shown, the IMS has communication interfaces with both the LTE network and the CDMA network. In particular, the P-CSCF of the IMS is shown having a communication interface with the PGW of the LTE network, so as to facilitate signaling communication (e.g., SIP signaling) between the IMS and WCDs served by the LTE network. And the TAS and SMS GW are shown having communication interfaces with the SS7 network, so as to facilitate signaling communication with the MSC, such as voice call setup/control signaling and SMS message communication for WCDs served by the CDMA network.

As to voice call service, when a WCD is registered with and served by the CDMA network, voice calls could be set up to or from the WCD via the CDMA network, with the TAS of the IMS (and one or more other nodes) being involved in the process. For example, when the WCD seeks to place a voice call and the MSC thus receives an Origination-Request (ORREQ) message from the WCD, or when the MSC receives an SS7 Integrated Services Digital Network User Part (ISUP) initial address message (IAM) seeking to set up a voice call to the WCD, the MSC may engage in SS7 signaling with the TAS (pursuant to an all-digits AIN trigger, for instance) and a media-gateway (MGW) function or media-gateway control function (MGCF) of the MSC may then further engage in SIP signaling with the TAS (e.g., transmitting to the TAS, via the S-CSCF, a SIP INVITE for the call), so that the TAS can act on the call setup request (e.g., applying various call handling rules). And the MSC may then complete setup of the voice call if appropriate.

In practice, the illustrated WCD 18 may be configured for single-radio-LTE (SRLTE) operation, meaning that the WCD may have a single radio that can selectively engage in LTE or CDMA communication but would not engage in both LTE and CDMA communication concurrently. Such a WCD may be configured to prioritize operation in LTE so that the WCD can engage in high speed data communication. Thus, when the WCD is in coverage of both the LTE network and the CDMA network as shown, the WCD may register (attach) with the LTE network, and the WCD may then operate primarily with LTE service, to facilitate packet-data communication. But the WCD may also separately register with the CDMA network to facilitate engaging in voice calls served by the CDMA network. Namely, once the WCD has registered with the LTE network, the WCD may temporarily tune away from LTE to CDMA, register directly with the CDMA network, and then return to LTE service. Further, the WCD may then periodically tune away from LTE to CDMA to check for any CDMA page messages or the like, and the WCD may tune away from LTE to CDMA to place voice calls when desired.

In addition, once the WCD has registered with the LTE network, the WCD may also register via the LTE network with the IMS, to enable the WCD to then interact with the IMS via the LTE network. In particular, the WCD may transmit a SIP REGISTER message via the WCD's IMS bearer to the P-CSCF, and the SIP REGISTER message may pass to an S-CSCF designated to serve the WCD. The S-CSCF may then query the HSS or PSS to obtain a profile record for the WCD, indicating services to which the WCD subscribes, such as SMS service for instance. And the S-CSCF may then engage in third-party registration of the WCD with one or more other applicable nodes of the IMS, such as the SMS GW, thereby informing each such other node that the WCD is accessible via that S-CSCF. Further, the S-CSCF may then respond with a SIP 200 OK message, which may pass to the P-SCSF and via the LTE network to the WCD.

Further, the WCD could periodically re-register with the IMS, by again sending a SIP REGISTER message to the P-CSCF. The WCD could be set to engage in such re-registration every hour or so, and the P-CSCF and/or S-CSCF could be set to expect WCD re-registration that often as well. If the WCD leaves LTE service, or for other reasons, the WCD may discontinue its re-registration with the IMS. And when that happens, the P-CSCF and/or S-CSCF may detect the absence of expected WCD re-registration. In response, the S-CSCF may then engage in third-party de-registration of the WCD from one or more other IMS nodes, such as the SMS GW, so as to notify those nodes that the WCD is no longer accessible via the S-CSCF.

With this arrangement, the SMS GW can operate as an SMS server for storing and forwarding SMS messages selectively via the LTE network or the CDMA network, functioning as an IS-41 Short Message Service Center (SMSC) to provide SMS messaging services via SS7 and the CDMA network, and functioning as an IP SMS GW to provide SMS messaging services via the LTE network.

In practice, the SMS GW may receive an SMS message in any of various forms and through various channels. For example, the SMS GW may receive an SMS message as an industry standard Short Message Delivery Point to Point (SMDPP) message via the SS7 network or the SMS GW may receive an SMS message as a SIP MESSAGE message via an IP network. The received SMS message may carry text to be rendered by a messaging application on the WCD and/or may take other forms, including for instance carrying a Multimedia Messaging System (MMS) notification that provides the WCD with a network address from which the WCD can download multimedia content such as image or video content for rendering by the WCD. Further, the SMS message may include a destination address or other information that establishes the WCD as a destination of the message, so that the SMS GW can determine by reading the message that the message is destined to a particular WCD, and the SMS GW can then work to route the message to that WCD.

To transmit an SMS message to a WCD via the LTE network, the SMS GW may determine which S-CSCF serves the WCD, based on which S-CSCF engaged in third party registration with the SMS GW on behalf of the WCD, and the SMS GW may then transmit the SMS message to that S-CSCF as a SIP MESSAGE message addressed to the WCD. That SIP MESSAGE may then pass via the P-CSCF to the PGW, along to the SGW, and to the eNodeB serving the WCD, and the eNodeB may then transmit the SMS message over the LTE air interface to the WCD for receipt and rendering by the WCD.

On the other hand, to transmit an SMS message to a WCD via the CDMA network, the SMS GW may determine which MSC serves the WCD, by sending a location-request (LOC-REQ) message via the SS7 network to the HLR and receiving a response from the HLR indicating a point code (address) of the MSC. The SMS GW may then transmit the SMS message as an SMDPP message via the SS7 network to the MSC. And the MSC may forward the message via the BSC to the BTS for transmission over the CDMA air interface to the WCD.

For each WCD that supports SMS service, the SPS of the IMS may hold a profile record that specifies default routing prioritization for SMS messages destined to the WCD, perhaps based on device type, plan type, device capabilities or the like. Namely, the profile record could indicate a primary route for routing SMS messages destined to the WCD and could further specify a secondary route for routing SMS messages destined to the WCD. The primary route could be the route that the SMS GW should use in the first instance when routing an SMS message to the WCD. And the secondary route could be the route that the SMS GW should use if transmission of the SMS message via the primary route fails or is not possible for some reason.

Because WCD 18 is an SRLTE device that would prefer operation in LTE, the SPS profile record for WCD 18 could specify the LTE network (or, more generally, packet-switched SMS transmission, which could be SIP MESSAGE transmission to an S-CSCF serving the WCD and via the LTE network to the WCD) as the primary route and the CDMA network (or, more generally, circuit-switched SMS transmission, which could be SMDPP transmission to the MSC serving the WCD and via the CDMA network to the WCD) as the secondary route.

Thus, when presented with an SMS message destined to WCD 18, the SMS GW may attempt transmission of the SMS message to the WCD via the LTE network and if that attempt, and if that attempt fails (perhaps after multiple re-tries), the SMS GW may then attempt transmission of the SMS message to the WCD via the CDMA network.

More particularly, when the SMS GW receives an SMS message destined to the WCD, the SMS GW may query the SPS and determine from the WCD's profile that the primary route for routing SMS messages destined to the WCD is packet-switched SMS transmission. Further, the SMS GW may note that the WCD is registered with the SMS GW by the S-CSCF that engaged in third party registration on behalf of the WCD. Therefore, the SMS GW may responsively transmit the SMS message to the S-CSCF for routing to the WCD via the LTE network. On the other hand, if the WCD has been de-registered from the IMS, the SMS GW can instead use the secondary route for routing the SMS message to the WCD. Namely, if the WCD is registered with the CDMA network, then the SMS GW can transmit the SMS message via the SS7 network to the WCD.

As noted above, a problem that can arise with this arrangement is that, when the WCD is registered with the IMS via the LTE network but the WCD tunes away from the LTE network to the CDMA network to engage in a voice call served by the CDMA network, the IMS network would think that the WCD is still accessible via the LTE network. This problem can arise, for instance, if the WCD transitions from the LTE network to the CDMA network to engage in a voice call and is gone from the LTE network for less than the WCD's IMS re-registration interval (e.g., an hour).

In that situation, the IMS would not have detected failure of re-registration by the WCD and would thus have not de-registered the WCD, and so the SMS GW would still attempt SMS message routing to the WCD via the LTE network. Yet because the WCD is not currently connected with the LTE network, this SMS message transmission would fail. And then only after that failure occurs (e.g., after several failed attempts) would the SMS GW then resort to using the secondary route, namely, to attempting transmission of the SMS message to the WCD via the CDMA network. Unfortunately, as noted above, this process could thus result in significant delay of the SMS transmission process, which could create user experience issues.

As explained above, to help address this issue, the system could be configured to detect that the CDMA network is serving the WCD with a voice call (e.g., that an incoming or outgoing voice call to be served by the CDMA network is being initiated, or that such a voice call is underway) and to responsively reconfigure the IMS so that the CDMA network (e.g., circuit-switched and SS7 communication), rather than the LTE network (e.g., packet-switched and SIP communication), will be used as the primary route for SMS message routing to the WCD.

Three specific implementations are contemplated for carrying this out by way of example, with other examples and variations being possible as well.

In a first implementation, the TAS could be configured (e.g., programmed or otherwise structured) to detect that the CDMA network is serving the WCD with a voice call and to responsively signal to the SMS GW to cause the SMS gateway to effectively change the primary SMS route for the WCD. For instance, the TAS could be configured to detect the SS7 and/or SIP signaling that occurs for such voice call setup as discussed above, and perhaps to note that the signaling is to/from the MSC of the CDMA network. And the TAS could be configured to responsively generate and send to the SMS GW a SIP OPTION message or other such message that informs the SMS GW of the situation. Such a message could indicate that the WCD is being served with a voice call by the CDMA network or could more generally indicate that the WCD is accessible via the CDMA network and that the CDMA network should be used as the primary SMS route for the WCD. As a result, when the SMS GW receives an SMS message destined to the WCD, the SMS GW would use the CDMA network as the primary route for routing the SMS message to the WCD, notwithstanding the fact that the WCD's profile indicates the LTE network should be used as the primary route for the WCD, and notwithstanding the fact that the WCD is currently registered with the IMS via the LTE network.

In a second implementation, the TAS could be configured to detect that the CDMA network is serving the WCD with a voice call and to responsively signal to the SPS to trigger a change of the WCD's service profile so as to indicate the CDMA network as the primary route for routing SMS messages destined to the WCD. For instance, the TAS could be configured to detect that the CDMA network is serving the WCD with a voice call in the manner noted above, and the TAS could be configured to responsively generate and send to the SPS a DIAMETER message to which the SPS would respond by changing the WCD's service profile so as to swap routing priorities of the LTE network (e.g., packet-switched route) and CDMA network (e.g., circuit-switched route). As a result, when the SMS GW receives an SMS message destined to the WCD and queries the SPS to determine SMS routing priority for the WCD, the SMS GW would thereby determine that the CDMA network is the primary route for routing the SMS message. The SMS GW would thus use the CDMA network as the primary route for routing the SMS message to the WCD, notwithstanding the fact that the WCD's profile indicates the LTE network should be used as the primary route for the WCD, and notwithstanding the fact that the WCD is currently registered with the IMS via the LTE network.

And in a third implementation, the S-CSCF could be configured to detect that the CDMA network is serving the WCD with a voice call and to responsively signal to the SMS GW to cause the SMS gateway to effectively change the primary SMS route for the WCD. For instance, when the MSC sends a SIP INVITE for the call to the TAS, that SIP INVITE may pass through the S-CSCF as noted above, and that SIP INVITE would identify the WCD. Thus, the S-CSCF may detect that the CDMA network is serving the WCD with a voice call based on the S-CSCF detecting that SIP signaling between the MSC and the TAS. And the S-CSCF could be configured to responsively generate and send to the SMS GW a SIP OPTION message, a SIP NOTIFY message, or another such message that informs the SMS GW of the situation. As a result, when the SMS GW receives an SMS message destined to the WCD, the SMS GW would then use the CDMA network as the primary route for routing the SMS message to the WCD, notwithstanding the fact that the WCD's profile indicates the LTE network should be used as the primary route for the WCD, and notwithstanding the fact that the WCD is currently registered with the IMS via the LTE network.

In addition, a similar arrangement and process can be used to revert configuration of the IMS back to its original default message-delivery prioritization in response to the end of the WCD's voice call or otherwise in response to determining that the CDMA network is no longer serving the WCD with a voice call. For example, when the WCD's call ends, the MSC (e.g., an MGCF) may transmit to the TAS a SIP BYE message indicating the end of the call. And in response to this SIP BYE message, the TAS could signal to the SMS GW and/or SPS to undo the change noted above, or the S-CSCF could signal to the SMS GW to undo the change noted above.

Note that this process goes beyond merely changing a message routing path because the client device at issue is being served by a particular access network, as the process specifically involves using the fact that the other access network is serving the client device with a voice call as a trigger for changing primary message route, and as the process can involve one or more of the specific advanced implementations discussed above.

Figure 2:
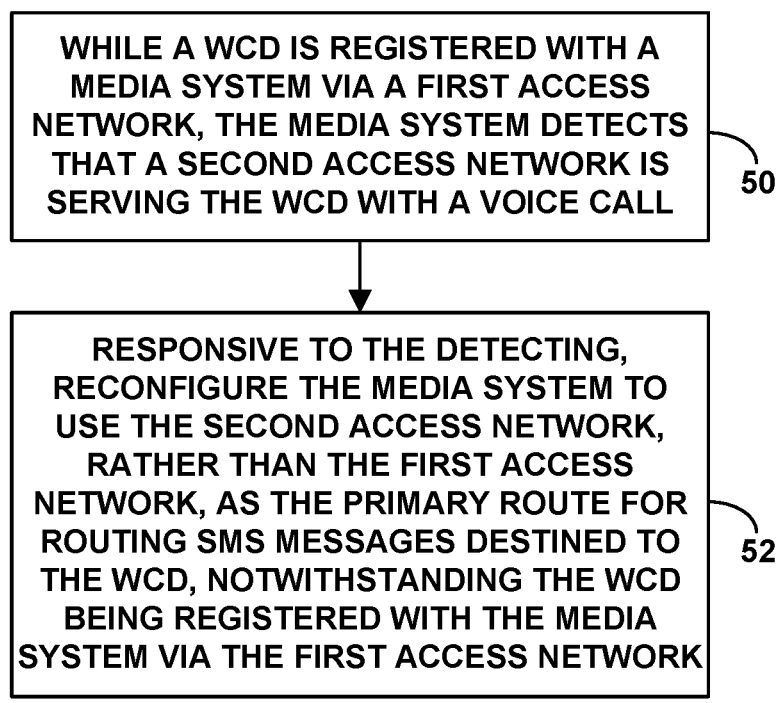
FIG. 2 is a flow chart depicting operations that can be carried out in accordance with the disclosure.

FIG. 2 is next a flow chart depicting operations that can be carried out in accordance with the discussion above, to control routing of SMS messages in an arrangement including a first access network (e.g., an LTE network), a second access network (e.g., a CDMA network), and a media system (e.g., an IMS), where, when a WCD is registered with the media system via the first access network, the media system is configured to use the first access network as a primary route for routing SMS messages destined to the WCD. As shown in FIG. 2, at block 50, the method involves, while the WCD is registered with the media system via the first access network, the media system detecting that the second access network is serving the WCD with a voice call.

And at block 52, the method involves, responsive to the detecting, reconfiguring the media system to use the second access network, rather than the first access network, as the primary route for routing SMS messages destined to the WCD, notwithstanding the WCD being registered with the media system via the first access network.

Further, as noted above, the method can additionally involve, after the reconfiguring of the media system to use the second access network as the primary route for routing SMS messages to the WCD, the media system detecting an end of the voice call. And the method can then involve, responsive to detecting the end of the voice call, reverting configuration of the media system to use the first access network, rather than the second access network, as the primary route for routing SMS messages destined to the WCD.

In line with the discussion above, the act of detecting that the second access network is serving the WCD with a voice call can involve detecting the second access network engaging in setup of the voice call. And the act of detecting the end of the voice call could involve detecting a call-teardown signal for the voice call.

Further, as discussed above, the media system could include a profile record for the WCD, and the profile record could indicate by default (e.g., as a default setting for the WCD, perhaps because the WCD is an SRLTE device, if that if that is the case) that the first access network should be used as the primary route for routing SMS messages destined to the WCD. And the media system could be configured to refer to that profile record to determine the primary route to use when presented with an SMS message for delivery to the WCD. In line with the discussion above, the act of reconfiguring the media system to use the second access network as the primary route for routing SMS messages to the WCD could then involve revising the profile record to indicate that the second access network should be used as the primary route for routing SMS messages destined to the WCD. Thus, after revising the profile record, when the media system then refers to the profile record to determine the primary route to use for routing an SMS message to the WCD, the media system would determine from the profile record that the second access network should be used as the primary route for routing the SMS message to the WCD and would accordingly use the second access network as the primary route for routing the SMS message to the WCD.

As additionally discussed above, the media system could include a profile server (e.g., SPS) that maintains the profile record for the WCD and can include a TAS. And the act of the media system detecting that the second access network is serving the WCD with the voice call could involve the TAS detecting the second access network engaging in setup of the voice call, and the act of revising the profile record could involve the TAS transmitting to the profile server a control signal (e.g., a DIAMETER message) that causes the profile server to revise the profile record.

Further, as discussed above, the method could involve, after the reconfiguring of the media system to use the second access network as the primary route for routing SMS messages to the WCD, the media system detecting an end of the voice call and, responsive to the detecting of the end of the voice call, reverting configuration of the media system to use the first access network, rather than the second access network, as the primary route for routing SMS messages destined to the WCD. For instance, the reverting could involve reverting the profile record to indicate that the first access network should be used as the primary route for routing SMS messages destined to the WCD. And after reverting the profile record, when the media system then refers to the profile record to determine the primary route to use for routing an SMS message to the WCD, the media system could thus determine from the profile record that the first access network should be used as the primary route for routing the SMS message to the WCD, and the media system could accordingly use the first access network as the primary route for routing the SMS message to the WCD.

In addition or alternatively, as discussed above, the media system could include an SMS GW that is configured to receive SMS messages and to route the received SMS messages to destinations. And the act of reconfiguring the media system to use the second access network as the primary route for routing SMS messages destined to the WCD could involve transmitting to the SMS GW a control signal that causes the SMS GW to use the second access network as the primary route for routing SMS messages destined to the WCD.

Here again, the media system could include a TAS, and the act of the media system detecting that the second access network is serving the WCD with the voice call could involve the TAS detecting the first access network engaging in setup of the voice call. Further, the act of transmitting to the SMS gateway the control signal that causes the SMS gateway to use the second access network as the primary route for routing SMS messages destined to the WCD could involve the TAS transmitting a control signal such as a SIP OPTION message to the SMS GW, with the SMS GW being configured to respond to the SIP OPTION message in the manner described above.

Still further, the media system can include CSCF through which setup signaling for the voice call passes. And in that case, the act of the media system detecting that the second access network is serving the WCD with the voice call could involve the CSCF detecting the setup signaling for the voice call, and the act of transmitting to the SMS GW the control signal that causes the SMS GW to use the second access network as the primary route for routing SMS messages destined to the WCD could involve the CSCF transmitting a control signal such as a SIP OPTION message or a SIP NOTIFY message to the SMS GW, with the SMS GW being configured to respond to the message in the manner described above.

And yet further, the method can additionally involve, after the reconfiguring of the media system to use the second access network as the primary route for routing SMS messages to the WCD, the media system detecting an end of the voice call, and responsively reverting configuration of the media system to use the first access network, rather than the second access network, as the primary route for routing SMS messages destined to the WCD, such as by transmitting to the SMS GW a further control signal that causes the SMS GW to use the first access network as the primary route for routing SMS messages destined to the WCD.

Figure 3:
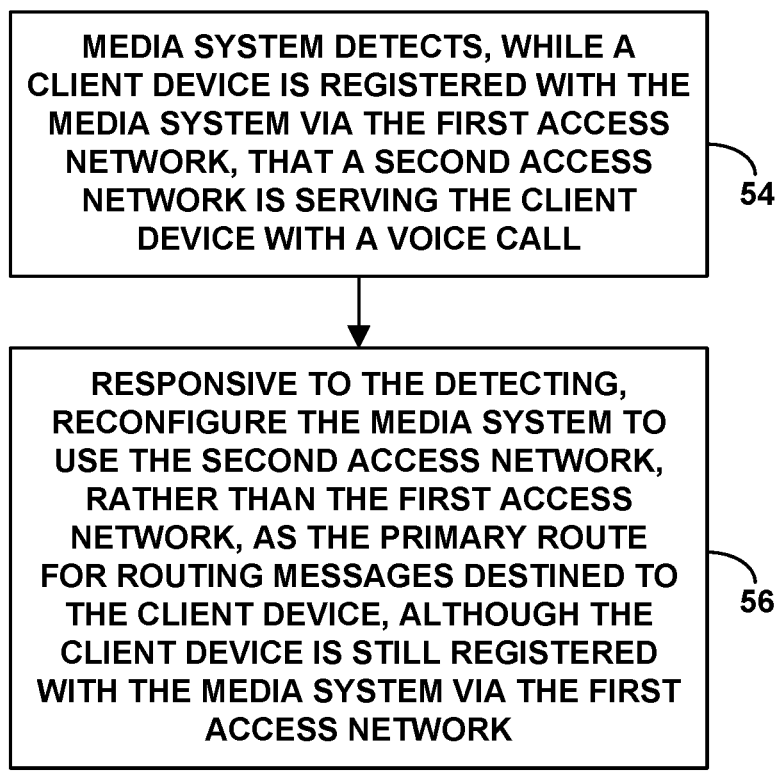
FIG. 3 is another flow chart depicting operations that can be carried out in accordance with the disclosure.

FIG. 3 is next another flow chart depicting operations that can be carried out in accordance with this disclosure, to control routing of messages, where a media system is configured by default to use a first access network as a primary route for routing messages destined to a client device when the client device is registered with the media system via the first access network. As shown in FIG. 3, at block 54, the method involves the media system detecting, while the client device is registered with the media system via the first access network, that a second access network is serving the client device with a voice call. And at block 56, the method further involves, responsive to the detecting, reconfiguring the media system to use the second access network, rather than the first access network, as the primary route for routing messages destined to the client device, although the client device is still registered with the media system via the first access network.

In addition, in line with the discussion above, the method can further involve, after the reconfiguring of the media system to use the second access network as the primary route for routing messages destined to the client device, detecting by the media system an end of the voice call. And the method can involve, responsive to detecting the end of the voice call, reverting configuration of the media system to use the first access network, rather than the second access network, as the primary route for routing messages destined to the client device.

Figure 4:
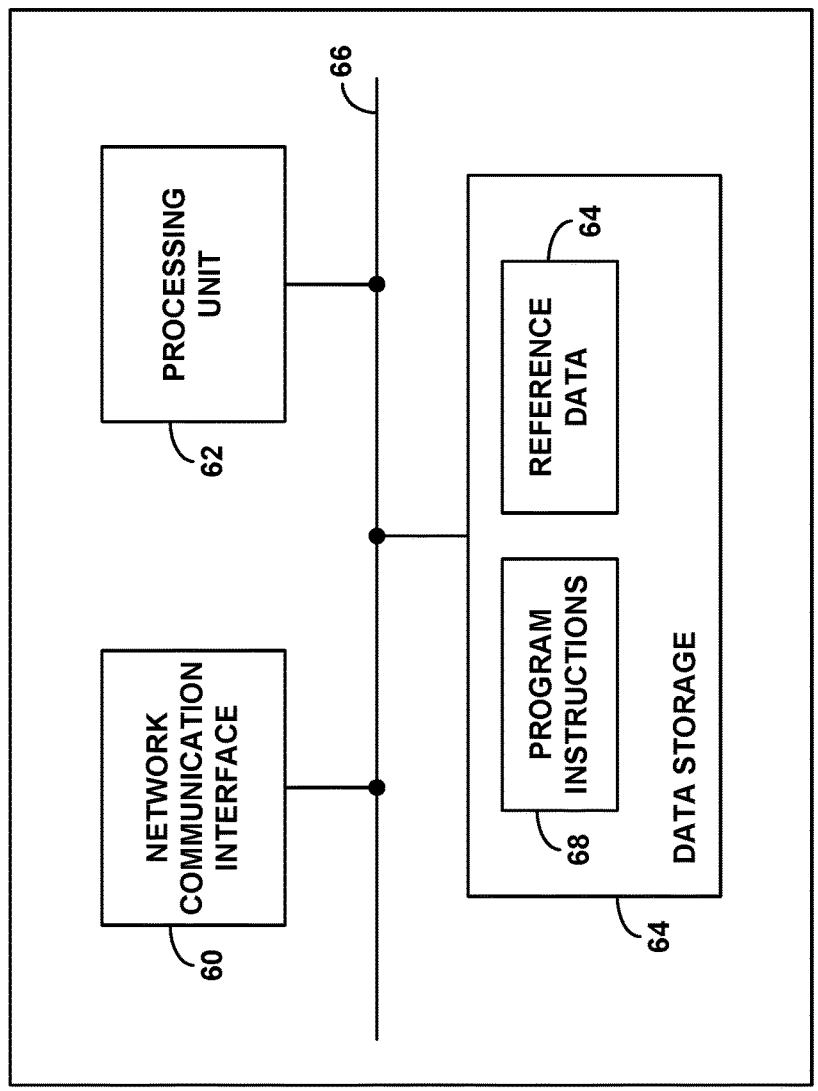
FIG. 4 is a simplified block diagram of an example node operable in accordance with the disclosure.

Finally, FIG. 4 is a simplified block diagram of a network node that can operate in the arrangement of FIG. 1 and in accordance with the discussion above. This network node could be representative of any of a variety of the nodes discussed above, such as an S-CSCF, a TAS, an SPS, or an SMS GW, among others. As shown in FIG. 4, the node includes a network communication interface 60, a processing unit 62, and non-transitory data storage 64, all of which may be coupled together by a system bus, network, or other connection mechanism 66.

The network communication interface 60 includes one or more hardware ports for connecting with and facilitating communication with other nodes, examples being wired or wireless Ethernet ports for instance. The processing unit 62 then includes one or more general purpose processors (e.g., microprocessors) and/or special purpose processors (application specific integrated circuits, etc.) And the data storage includes one or more volatile and/or non-volatile storage components, such as magnetic, optical, or flash memory modules for instance. As further shown, the data storage may hold program instructions 68 and reference data 70. The program instructions could be executable by the processing unit 62 to carry out various operations as described above. And the reference data could comprise various data to facilitate operations as discussed above.

Exemplary embodiments have been described above. Those skilled in the art will understand, however, that changes and modifications may be made to these embodiments without departing from the true scope and spirit of the invention.

We claim:

1. A method for controlling routing of Short Message Service (SMS) messages in an arrangement comprising a first access network, a second access network, and a media system, wherein, when a wireless communication device (WCD) is registered with the media system via the first access network, the media system is configured to use the first access network as a primary route for routing SMS messages destined to the WCD, the method comprising:
   while the WCD is registered with the media system via the first access network, detecting by the media system that the second access network is serving the WCD with a voice call; and
   responsive to the detecting, reconfiguring the media system to use the second access network, rather than the first access network, as the primary route for routing SMS messages destined to the WCD, notwithstanding the WCD being registered with the media system via the first access network.

2. The method of claim 1, wherein the media system is an Internet Protocol Multimedia Subsystem (IMS).

3. The method of claim 1, further comprising:
after the reconfiguring of the media system to use the second access network as the primary route for routing SMS messages to the WCD, detecting by the media system an end of the voice call; and
responsive to detecting the end of the voice call, reverting configuration of the media system to use the first access network, rather than the second access network, as the primary route for routing SMS messages destined to the WCD.

4. The method of claim 3,
wherein detecting that the second access network is serving the WCD with a voice call comprises detecting the second access network engaging in setup of the voice call, and
wherein detecting the end of the voice call comprises detecting a call-teardown signal for the voice call.

5. The method of claim 1, wherein the media system includes a profile record for the WCD, the profile record indicating by default that the first access network should be used as the primary route for routing SMS messages destined to the WCD, and wherein the media system is configured to refer to the profile record to determine the primary route to use when presented with an SMS message destined to the WCD,
wherein reconfiguring the media system to use the second access network as the primary route for routing SMS messages to the WCD comprises revising the profile record to indicate that the second access network should be used as the primary route for routing SMS messages destined to the WCD,
whereby, after revising the profile record, when the media system then refers to the profile record to determine the primary route to use for routing an SMS message destined to the WCD, the media system will determine from the profile record that the second access network should be used as the primary route for routing the SMS message destined to the WCD and will accordingly use the second access network as the primary route for routing the SMS message destined to the WCD.

6. The method of claim 5, wherein the media system includes a profile server that maintains the profile record for the WCD, wherein the media system includes a telephony application server (TAS), wherein detecting by the media system that the second access network is serving the WCD with the voice call comprises the TAS detecting the second access network engaging in setup of the voice call, and
wherein revising the profile record comprises the TAS transmitting to the profile server a control signal that causes the profile server to revise the profile record.

7. The method of claim 6, wherein the control signal comprises a DIAMETER message.

8. The method of claim 5, further comprising:
after the reconfiguring of the media system to use the second access network as the primary route for routing SMS messages to the WCD, detecting by the media system an end of the voice call; and
responsive to detecting the end of the voice call, reverting configuration of the media system to use the first access network, rather than the second access network, as the primary route for routing SMS messages destined to the WCD,
wherein reverting configuration of the media system to use the first access network, rather than the second access network, as the primary route for routing SMS messages destined to the WCD comprises reverting the profile record to indicate that the first access network should be used as the primary route for routing SMS messages destined to the WCD,
whereby, after reverting the profile record, when the media system then refers to the profile record to determine the primary route to use for routing an SMS message destined to the WCD, the media system will determine from the profile record that the first access network should be used as the primary route for routing the SMS message destined to the WCD and will accordingly use the first access network as the primary route for routing the SMS message destined to the WCD.

9. The method of claim 1, wherein the media system includes an SMS gateway configured to receive SMS messages and to route the received SMS messages to destinations, wherein reconfiguring the media system to use the second access network as the primary route for routing SMS messages destined to the WCD comprises transmitting to the SMS gateway a control signal that causes the SMS gateway to use the second access network as the primary route for routing SMS messages destined to the WCD.

10. The method of claim 9, wherein the media system includes a telephony application server (TAS), wherein detecting by the media system that the second access network is serving the WCD with the voice call comprises the TAS detecting the first access network engaging in setup of the voice call, and
wherein transmitting to the SMS gateway the control signal that causes the SMS gateway to use the second access network as the primary route for routing SMS messages destined to the WCD comprises the TAS transmitting the control signal to the SMS gateway.

11. The method of claim 10, wherein the control signal comprises a Session Initiation Protocol (SIP) OPTION message.

12. The method of claim 9, wherein the media system includes a call session control function (CSCF) through which setup signaling for the voice call passes, wherein detecting by the media system that the second access network is serving the WCD with the voice call comprises the CSCF detecting the setup signaling for the voice call, and
wherein transmitting to the SMS gateway the control signal that causes the SMS gateway to use the second access network as the primary route for routing SMS messages destined to the WCD comprises the CSCF transmitting the control signal to the SMS gateway.

13. The method of claim 12, wherein the control signal comprises a Session Initiation Protocol (SIP) message selected from the group consisting of a SIP OPTION message and a SIP NOTIFY message.

14. The method of claim 9, further comprising:
after the reconfiguring of the media system to use the second access network as the primary route for routing SMS messages to the WCD, detecting by the media system an end of the voice call; and
responsive to detecting the end of the voice call, reverting configuration of the media system to use the first access network, rather than the second access network, as the primary route for routing SMS messages destined to the WCD,
wherein reverting configuration of the media system to use the first access network, rather than the second access network, as the primary route for routing SMS messages destined to the WCD comprises transmitting to the SMS gateway a further control signal that causes the SMS gateway to use the first access network as the primary route for routing SMS messages destined to the WCD.

15. An Internet Protocol Multimedia Subsystem (IMS) configured to control routing of Short Message Service (SMS) messages, the IMS including:
    an SMS gateway operable to route SMS messages via a first access network and operable to route SMS messages via a second access network, wherein when a wireless communication device (WCD) is registered with the IMS via the first access network, the SMS gateway defaults to using the first access network as a primary route for routing SMS messages destined to the WCD;
    a telephony application server (TAS) operable to engage in voice call setup signaling with the second access network; and
    a call session control function (CSCF) through which the voice call setup signaling passes,
    wherein the TAS or CSCF (i) detects, based on the voice call setup signaling, that the second access network is serving the WCD with a voice call and (ii) responds to the detecting by causing the SMS gateway to use the second access network, rather than the first access network, as the primary route for routing SMS messages destined to the WCD, notwithstanding the WCD being registered with the IMS via the first access network.

16. The IMS of claim 15, wherein causing the SMS gateway to use the second access network, rather than the first access network, as the primary route for routing SMS messages destined to the WCD comprises transmitting to the SMS gateway a control signal that causes the SMS gateway to use the second access network as the primary route for routing SMS messages to the WCD.

17. The IMS of claim 15, further comprising a profile server that maintains a profile record for the WCD indicating that the first access network should be used as the primary route for routing SMS messages destined to the WCD, wherein the SMS gateway refers to the profile record to determine a primary route to use when presented with an SMS message for delivery to the WCD,
    wherein causing the SMS gateway to use the second access network, rather than the first access network, as the primary route for routing SMS messages destined to the WCD comprises transmitting a control signal to the profile server to cause the profile server to update the profile record for the WCD to indicate that the second access network should be used as the primary route for routing SMS messages destined to the WCD.

18. A method for controlling routing of messages, wherein a media system is configured by default to use a first access network as a primary route for routing messages destined to a client device when the client device is registered with the media system via the first access network, the method comprising:
    detecting by the media system, while the client device is registered with the media system via the first access network, that a second access network is serving the client device with a voice call; and
    responsive to the detecting, reconfiguring the media system to use the second access network, rather than the first access network, as the primary route for routing messages destined to the client device, although the client device is still registered with the media system via the first access network.

19. The method of claim 18, further comprising:
    after the reconfiguring of the media system to use the second access network as the primary route for routing messages destined to the client device, detecting by the media system an end of the voice call; and
    responsive to detecting the end of the voice call, reverting configuration of the media system to use the first access network, rather than the second access network, as the primary route for routing messages destined to the client device.

20. The method of claim 18, wherein the media system is an Internet Protocol Multimedia Subsystem (IMS).

* * * * *